United States Patent
Maier et al.

(10) Patent No.: US 8,465,207 B2
(45) Date of Patent: Jun. 18, 2013

(54) AUXILIARY BEARING SYSTEM WITH OIL RESERVOIR FOR MAGNETICALLY SUPPORTED ROTOR SYSTEM

(75) Inventors: William C. Maier, Almond, NY (US); Joseph A. Tecza, Scio, NY (US)

(73) Assignee: Dresser-Rand Company, Olean, NY (US)

( * ) Notice: Subject to any disclaimer, the term of this patent is extended or adjusted under 35 U.S.C. 154(b) by 89 days.

(21) Appl. No.: 12/900,638

(22) Filed: Oct. 8, 2010

(65) Prior Publication Data

US 2011/0085754 A1 Apr. 14, 2011

Related U.S. Application Data (60) Provisional application No. 61/250,417, filed on Oct. 9, 2009.

(51) Int. Cl.
*F16C 19/00* (2006.01)
(52) U.S. Cl.
USPC .......................................... 384/465; 384/472
(58) Field of Classification Search
USPC .............. 384/462, 464, 465, 467, 471, 473, 384/472; 184/6.16, 11.1, 13.1
See application file for complete search history.

(56) References Cited

U.S. PATENT DOCUMENTS

| | | | |
|---|---|---|---|
| 496,888 A * | 5/1893 | Morrison | 384/464 |
| 2,231,323 A | 2/1941 | Cawood | |
| 2,447,671 A * | 8/1948 | Schuck | 384/468 |
| 2,950,943 A * | 8/1960 | Forrest | 384/465 |
| 3,295,801 A | 1/1967 | McDowall et al. | |
| 3,630,586 A | 12/1971 | Pitner | |
| 3,683,734 A | 8/1972 | Claussen | |
| 3,796,283 A * | 3/1974 | Raby | 384/404 |
| 3,827,337 A | 8/1974 | Pruvot | |
| 3,947,153 A | 3/1976 | Matthias et al. | |
| 4,063,786 A | 12/1977 | Rall | |
| 4,128,280 A | 12/1978 | Purtschert | |
| 4,141,604 A | 2/1979 | Haberman et al. | |
| 4,213,661 A | 7/1980 | Marmol | |

(Continued)

FOREIGN PATENT DOCUMENTS

| JP | 08-082397 A | 3/1996 |
|---|---|---|
| JP | 2001-124062 A | 5/2001 |

(Continued)

OTHER PUBLICATIONS

PCT/US2010/051922 International Search Report and Written Opinion dated Jun. 30, 2011 (8 pages).

(Continued)

*Primary Examiner* — James Pilkington
(74) *Attorney, Agent, or Firm* — Edmonds & Nolte, PC (57) ABSTRACT

An auxiliary bearing including a bearing mount disposed circumferentially about a shaft. A support wall may extend radially inward from the bearing mount, and the support wall may define a first annular cavity. An outer race may be coupled to a radially inner surface of the support wall. An inner race may be rotatably coupled to the outer race, and a plurality of rolling elements may be disposed between the inner and outer races. A pool of lubricant may be disposed within the first annular cavity, and at least a lowermost one of the plurality of rolling elements may be at least partially disposed in the pool.

13 Claims, 5 Drawing Sheets

U.S. PATENT DOCUMENTS

| | | | |
|---|---|---|---|
| 4,460,283 A | | 7/1984 | Yoshioka et al. |
| 4,526,483 A | | 7/1985 | Hishikawa et al. |
| 4,542,994 A | | 9/1985 | Mohsin |
| 4,545,586 A | | 10/1985 | Von Pragenau |
| 4,553,855 A | | 11/1985 | De Choudhury |
| 4,597,676 A | | 7/1986 | Vohr et al. |
| 4,657,414 A | | 4/1987 | Stella |
| 4,683,111 A | | 7/1987 | Helm et al. |
| 4,704,039 A | * | 11/1987 | Ide .................... 384/464 |
| 4,827,169 A | | 5/1989 | Habermann |
| 4,872,767 A | | 10/1989 | Knapp |
| 4,929,158 A | | 5/1990 | Girault |
| 4,982,126 A | | 1/1991 | Jolivet et al. |
| 5,021,697 A | | 6/1991 | Kralick |
| 5,083,053 A | | 1/1992 | New |
| 5,126,612 A | | 6/1992 | Girault |
| 5,150,975 A | * | 9/1992 | Major et al. ........... 384/465 |
| 5,231,323 A | | 7/1993 | New |
| 5,272,403 A | * | 12/1993 | New ................... 310/90.5 |
| 5,341,527 A | | 8/1994 | Schmidt et al. |
| 5,347,190 A | | 9/1994 | Lewis et al. |
| 5,355,040 A | | 10/1994 | New |
| 5,425,584 A | | 6/1995 | Ide |
| 5,521,448 A | | 5/1996 | Tecza et al. |
| 5,547,287 A | | 8/1996 | Zeidan |
| 5,601,155 A | * | 2/1997 | Gardner ................ 184/11.2 |
| 5,616,976 A | | 4/1997 | Fremerey et al. |
| 5,630,881 A | | 5/1997 | Ogure et al. |
| 5,693,994 A | | 12/1997 | New |
| 5,714,818 A | | 2/1998 | Eakman et al. |
| 5,749,700 A | | 5/1998 | Henry et al. |
| 5,752,774 A | | 5/1998 | Heshmat et al. |
| 5,803,612 A | | 9/1998 | Battig |
| 5,810,485 A | | 9/1998 | Dublin, Jr. et al. |
| 5,977,677 A | | 11/1999 | Henry et al. |
| 6,036,435 A | | 3/2000 | Oklejas |
| 6,078,120 A | | 6/2000 | Casaro et al. |
| 6,155,720 A | | 12/2000 | Battig |
| 6,194,801 B1 | | 2/2001 | Goransson |
| 6,196,809 B1 | | 3/2001 | Takahashi et al. |
| 6,244,749 B1 | | 6/2001 | Nakagawa et al. |
| 6,309,174 B1 | | 10/2001 | Oklejas, Jr. et al. |
| 6,310,414 B1 | | 10/2001 | Agahi et al. |
| 6,353,273 B1 | | 3/2002 | Heshmat et al. |
| 6,402,385 B1 | | 6/2002 | Hayakawa et al. |
| 6,770,993 B1 | | 8/2004 | Heshmat et al. |
| 6,846,158 B2 | | 1/2005 | Hull |
| 6,987,339 B2 | | 1/2006 | Adams et al. |
| 7,240,583 B2 | | 7/2007 | Wingett et al. |
| 7,264,430 B2 | | 9/2007 | Bischof et al. |
| 7,367,713 B2 | | 5/2008 | Swann et al. |
| 7,429,811 B2 | | 9/2008 | Palazzolo et al. |
| 7,694,540 B2 | | 4/2010 | Ishida et al. |
| 7,836,601 B2 | | 11/2010 | El-Shafei |
| 2004/0047526 A1 | | 3/2004 | Dewachter |
| 2004/0189124 A1 | | 9/2004 | Baudelocque et al. |
| 2006/0204153 A1 | | 9/2006 | Alam et al. |
| 2007/0036476 A1 | | 2/2007 | Lane et al. |
| 2009/0302698 A1 | | 12/2009 | Menz et al. |
| 2010/0021095 A1 | | 1/2010 | Maier |
| 2011/0052109 A1 | | 3/2011 | Tecza et al. |

FOREIGN PATENT DOCUMENTS

| | | |
|---|---|---|
| KR | 10-1989-0010437 A | 8/1989 |
| KR | 10-0207986 B1 | 7/1999 |
| WO | 91-17367 | 11/1991 |
| WO | 01-57408 A1 | 8/2001 |
| WO | 2006-098806 A1 | 9/2006 |
| WO | 2007-047976 A1 | 4/2007 |
| WO | 2011-044423 A1 | 4/2011 |
| WO | 2011-044428 A1 | 4/2011 |
| WO | 2011-044432 A1 | 4/2011 |
| WO | 2011-020746 A1 | 7/2011 |

OTHER PUBLICATIONS

PCT/US2010/051927 International Search Report and Written Opinion dated Jun. 30, 2011 (8 pages).

Tecza and Walton, "A Chambered Porous Damper for Rotor Vibration Control: Part I—Concept Development" in The American Society of Mechanical Engineers, NY, 7 pages.

Walton and Martin, "A Chambered Porous Damper for Rotor Vibration Control: Part II—Imbalance Response and Bladeloss Simulation" in The American Society of Mechanical Engineers, NY, 7 pages.

PCT/US2010/051930 International Search Report and Written Opinion dated Jun. 30, 2011 (8 pages).

PCT/US2010/051932 International Search Report and Written Opinion dated Jun. 30, 2011 (8 pages).

PCT/US2010/020746 International Search Report and Written Opinion dated Sep. 23, 2011 (8 pages).

"Auxiliary Bearings in Vertically Oriented Machines on Magnetic Bearings," EPRI, Palo Alto, CA: 2001. 1003177.

Extended European search report for EP 06817242.8 dated Aug. 7, 2009, 3 pages.

Supplementary European search report for EP 06817242.8 dated Aug. 25, 2009, 1 page.

International Preliminary Report on Patentability for PCT/US2006/041127 dated Apr. 23, 2008, 4 pages.

Written Opinion of the International Searching Authority for PCT/US2006/041127 dated Mar. 19, 2007, 3 pages.

* cited by examiner

AUXILIARY BEARING SYSTEM WITH OIL RESERVOIR FOR MAGNETICALLY SUPPORTED ROTOR SYSTEM

CROSS REFERENCE TO RELATED APPLICATIONS

This application claims priority to U.S. Patent Application Ser. No. 61/250,417, which was filed Oct. 9, 2009. This priority application is hereby incorporated by reference in its entirety into the present application, to the extent that it is not inconsistent with the present application.

BACKGROUND

This disclosure relates in general to auxiliary bearing systems, and in particular to an auxiliary bearing system including a reservoir containing lubricant for lubricating and/or cooling the auxiliary bearing system.

In turbomachine systems, an auxiliary bearing system is used to support a shaft when a primary bearing system, such as a magnetic bearing system, fails. When the shaft drops, an inner race of the auxiliary bearing system engages the shaft, and the inner race and rolling elements supporting the inner race spin up to the speed of the shaft. This rapid acceleration causes a great amount of frictional heat in the auxiliary bearing system, which reduces the lifespan of the auxiliary bearing system.

Lubricant can be supplied to the auxiliary bearing system to reduce the heat generated during a drop event. However conventional lubrication systems do not supply an adequate supply of lubricant in a timely manner. Therefore, what is needed is an auxiliary bearing system capable of providing lubricant for lubricating and/or cooling the auxiliary bearing system during a drop event.

SUMMARY

Embodiments of the disclosure may provide an auxiliary bearing. The auxiliary bearing may include a bearing mount disposed circumferentially about a shaft. A support wall may extend radially inward from the bearing mount and define a first annular cavity. An outer race may be coupled to a radially inner surface of the support wall. An inner race may be rotatably coupled to the outer race, and a plurality of rolling elements may be disposed between the inner and outer races. A pool of lubricant may be disposed within the first annular cavity, and a lowermost one of the plurality of rolling elements may be at least partially disposed in the pool.

Embodiments of the disclosure may further provide another auxiliary bearing. The auxiliary bearing may include a bearing mount disposed circumferentially about a shaft. A support wall may extend radially inward from the bearing mount and define a first annular cavity. An outer race may be coupled to a radially inner surface of the support wall. An inner race may be rotatably coupled to the outer race, and a plurality of rolling elements may be disposed between the inner and outer races. A pool of lubricant may be disposed within the first annular cavity. A slinger may be coupled to or integral with the inner race, and an end of the slinger, distal the inner race, may be adapted to collect lubricant from the pool.

Embodiments of the disclosure may further provide a method of supporting a shaft with an auxiliary bearing. The method may include engaging the shaft with an inner race of a roller element bearing. The method may also include rotating the inner race in response to the rotation of the shaft. The method may further include rotating a slinger in response to the rotation of the inner race, and the slinger may be coupled to or integrated with the inner race. The method may further include collecting lubricant in a pocket of the slinger. The method may further include scooping the lubricant out of the pocket with a fin.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

Figure 1:
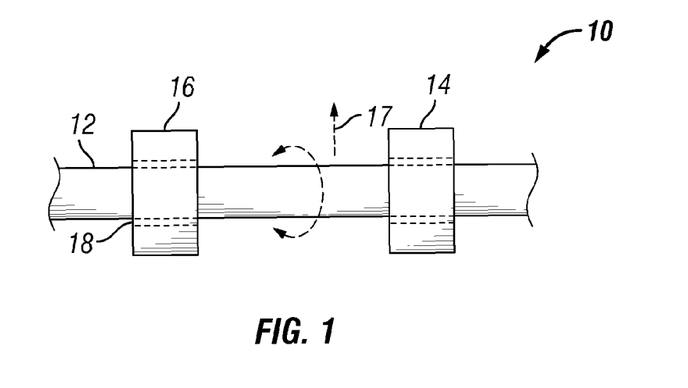
FIG. 1 is a schematic elevational view of a rotor system according to an exemplary embodiment, the rotor system including a shaft, a magnetic bearing system and an auxiliary bearing system in an operational orientation when the shaft is levitated by the magnetic bearing system.

In an exemplary embodiment, as illustrated in FIG. 1, a rotor system is generally referred to by the reference numeral 10 and includes a shaft 12 normally supported by an active magnetic bearing system 14. When the magnetic bearing system 14 is unable to support the shaft 12, an auxiliary bearing system 16 is configured to support the shaft 12. The magnetic bearing system 14 and the auxiliary bearing system 16 are positioned at one or more axially-spaced locations along the shaft 12 including, but not limited to, opposing end portions of the shaft 12. The auxiliary bearing system 16 may be disposed either inboard or outboard from the magnetic bearing system 14, depending on the specific application, as would be familiar to one skilled in the art. In several exemplary embodiments, the rotor system 10 includes, or is part of, a turbomachine such as, for example, a compressor, turbine, or expander.

When the magnetic bearing system 14 is supporting the shaft 12, the shaft 12 is levitated relative to the auxiliary bearing system 16, as shown by the arrow 17 in FIG. 1, and a radial clearance 18 exists between the shaft 12 and the auxiliary bearing system 16. When the magnetic bearing system 14 fails, de-levitation of the rotating shaft 12 occurs, and the shaft 12 drops down onto the auxiliary bearing system 16, causing the auxiliary bearing system 16 to support the shaft 12 in a stable position, thereby allowing for safe coast down to stop the rotor system 10.

Figure 2:
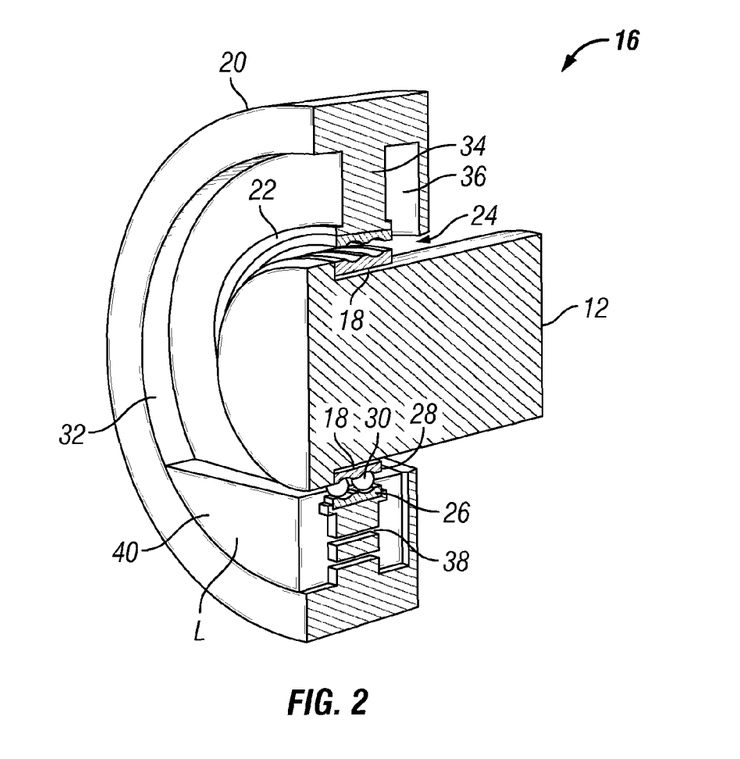
FIG. 2 is a cut-away perspective view of a portion of the shaft and an auxiliary bearing structure shown in FIG. 1, the auxiliary bearing structure being in an operational configuration in which the shaft is de-levitated.
Figure 3:
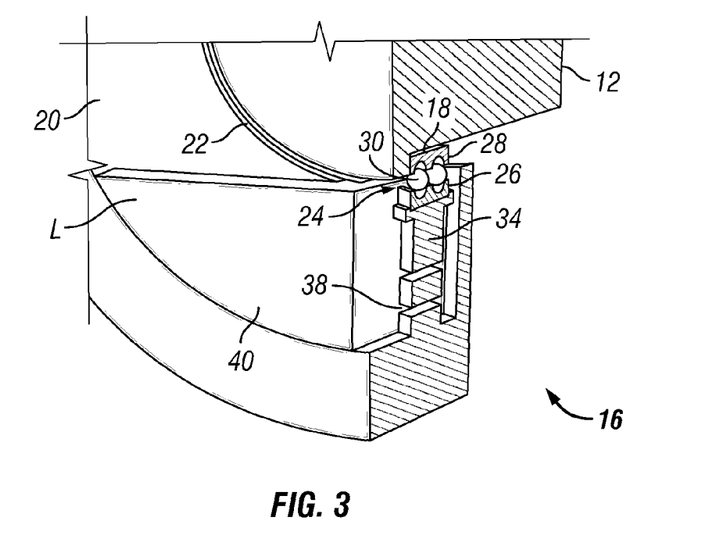
FIG. 3 is an enlarged scale detail view of a lower portion of the FIG. 2 auxiliary bearing structure.

As illustrated in FIGS. 2 and 3, the exemplary auxiliary bearing system 16 includes a stationary, hollow bearing mount 20 of a representatively circular shape with a central circular opening 22, through which the shaft 12 extends. A rolling element bearing 24 may be mounted within the bearing mount 20. Specifically, an outer race 26 of the rolling element bearing 24 may be coupled to an inner surface of the bearing mount 20 circumferentially along the circular opening 22. When the active magnetic bearing system 14 (see FIG. 1) supports the shaft 12, the radial clearance 18 may be defined between the shaft 12 and an inner race 28 of the rolling element bearing 24. However, when the active magnetic bearing system 14 is not supporting the shaft 12, the shaft 12 may drop and engage the inner race 28 of the rolling element bearing 24. The inner race 28 may be rotatably coupled to the outer race 26 such that the inner race 28 is adapted to rotate relative to the stationary outer race 26 when the shaft 12 engages the inner race 28. Rolling elements 30 disposed between the inner and outer races 26,28 facilitate the relative rotation of the inner race 28 with respect to the outer race 26. In several exemplary embodiments, instead of the rolling element bearing 24, various other types of bearings may be mounted within the bearing mount 20.

Opposing annular grooves 32 extend around the interior of the bearing mount 20. A central radial support wall 34 extends radially inward from the bearing mount 20 and defines one or more annular cavities 36 within the bearing mount 20. A series of openings 38 may be disposed through a lower portion of the support wall 34, thereby providing fluid communication between the annular cavities 36. The lower portion of the annular cavity 36 forms a reservoir 40 which may be at least partially filled with a pool of suitable lubricant L, for example lubricating oil. In an exemplary embodiment, the lowermost rolling elements 30 are in contact with the lubricant L. For example, the level of the pool of lubricant L may be at or about the center of the lowermost rolling elements 30. However, as can be appreciated, the level of the pool of lubricant L may vary depending on the amount of lubricant L to be distributed within the auxiliary bearing system 16. When the active magnetic bearing system 14 is supporting the shaft 12, the lubricant L is not (or is minimally) disturbed by the rotation of the shaft 12, and instead forms a quiescent pool in the reservoir 40. When the auxiliary bearing system 16 is supporting the rotating shaft 12, the moving parts of the auxiliary bearing system 16 provide a continuous flow of lubrication through the auxiliary bearing system 16.

Oil seals (not illustrated) may extend radially inward from opposing inside surfaces of the bearing mount 20 and sealingly engage the shaft 12 where it enters the bearing mount 20. In an exemplary embodiment, one or more of the oil seals includes a suitable brush-type seal configured to accommodate shaft de-levitation without damage. In several exemplary embodiments, instead of, or in addition to brush seals, the oil seals may include one or more lip seals, other types of seals, and/or combinations thereof.

In operation, when the active magnetic bearing system 14 is supporting the rotating shaft 12, the shaft 12 is levitated relative to the auxiliary bearing system 16. Due to the radial clearance 18 between the shaft 12 and the inner race 28 of the roller element bearing 24, there may be little or no relative rotation between the stationary outer race 26 and the inner race 28; thus, there may be little or no disturbance of the lubricant L in the reservoir 40 by the rotation of the shaft 12. In an exemplary embodiment, during operation of the rotor system 10 with the magnetic bearing active, components of the auxiliary bearing system 16, including at least the inner race 28, may not rotate or spin within the bearing mount 20.

When the magnetic bearing system fails, de-levitation of the shaft 12 occurs, the shaft 12 drops down onto the inner race 28, and the inner race 28 engages and supports the weight of the shaft 12. When the rotating shaft 12 engages the inner race 28, the rotating shaft 12 causes the inner race 28 to rotate (spin up). When the inner race 28 rotates, the lowermost rolling elements 30 that are at least partially submerged in the lubricant L in the reservoir 40 rotate or spin and pick up oil as they pass through the reservoir 40, thus distributing the lubricant L to the rotating inner race 28 by a splashing or carrying action. When the lubricant L is distributed to the inner race 28, the inner race 28 may distribute the lubricant L throughout the interior of the rolling element bearing 24. The lubricant L serves to lubricate and cool the rolling element bearing 24, thereby greatly extending the operating time of the auxiliary bearing system 16. The oil seals accommodate the de-levitation of the shaft 12, maintaining their respective sealing engagements with the shaft 12.

The auxiliary bearing system 16 thus has a built-in lubrication system that works only when the auxiliary bearing system 16 and/or one or more components thereof is actively spinning and supporting the rotating shaft 12. The lubricant L circulation during the operation of the auxiliary bearing system 16 is passive. The auxiliary bearing system 16 self-actuates during the drop of the shaft 12 or during a coast-down event. The use of liquid lubricant L provides cooling as well as lubrication for the auxiliary bearing system 16, and as a result, risks associated with thermal growths and overheating of the bearing elements are minimized. The auxiliary bearing system 16 is relatively small, self-contained, and can be easily installed within the overall rotor system 10.

In an exemplary embodiment, the rotor system 10 may be located in a relatively isolated area such as, for example, a sub-sea installation. If the magnetic bearing system 14 normally supporting the shaft 12 fails, the auxiliary bearing system 16 can accommodate or support the rotating shaft 12 for an extended period of time such as, for example, three or four weeks, until the rotor system 10 is reached by a repair crew and the magnetic bearing system 14 is repaired and/or replaced (and, in some embodiments, until the auxiliary bearing system 16 and/or other components of the rotor system 10 are also repaired and/or replaced). In an exemplary embodiment, the auxiliary bearing system 16 can accommodate or support the rotating or spinning shaft 12 at a reduced load for an extended period of time such as, for example, three or four weeks. This desirable ability of the auxiliary bearing system 16 to operate for extended time periods is facilitated by the provision of the communication openings 38 in the internal bearing mount support wall 34 which aid in the dissipation of operating heat of the bearing 24 to the bearing mount or housing 20.

Figure 4:
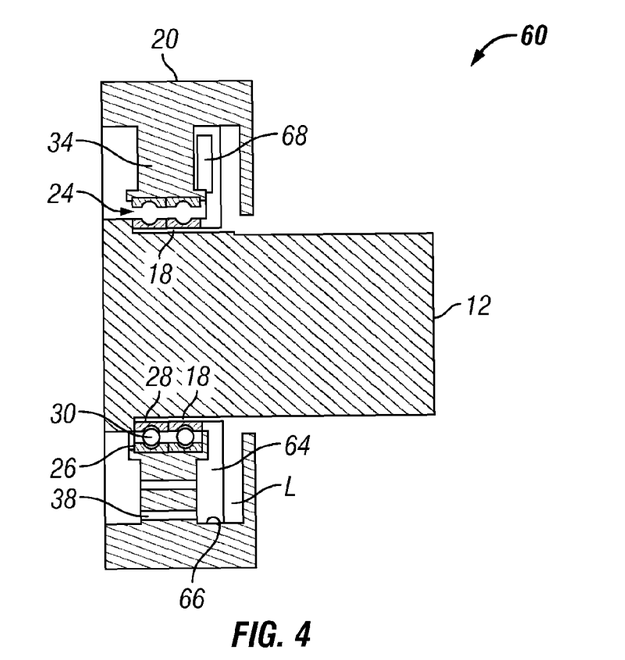
FIG. 4 is a cross-sectional view of a portion of the de-levitated shaft and another exemplary embodiment of the FIG. 2 auxiliary bearing structure.
Figure 5:
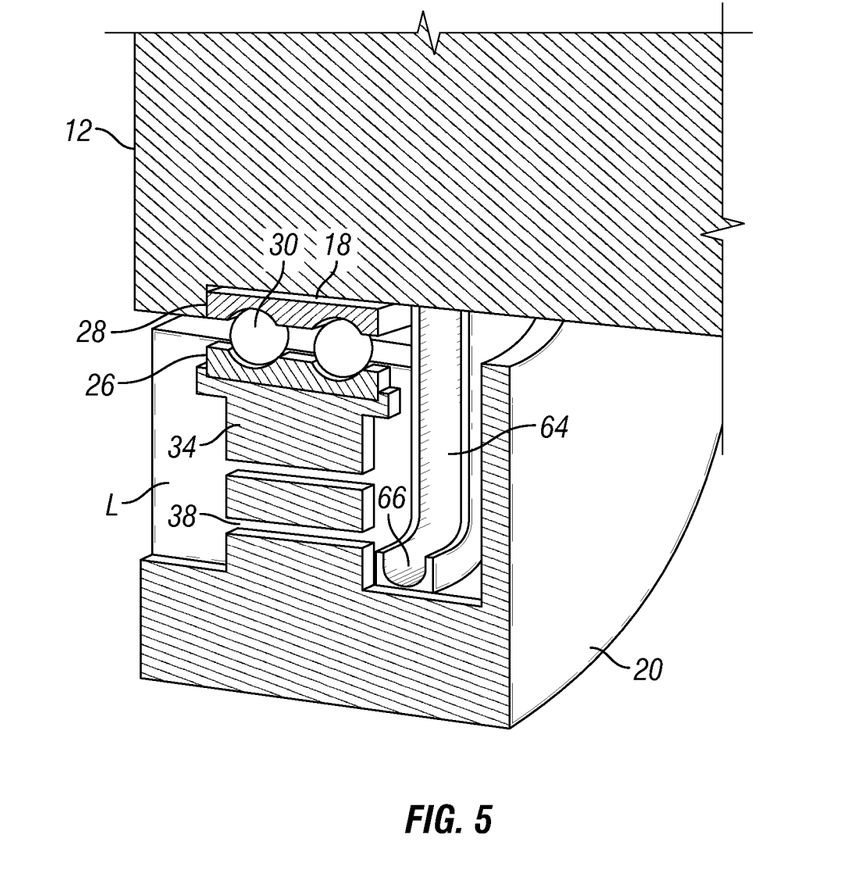
FIG. 5 is an enlarged scale detail view of a lower portion of the FIG. 4 auxiliary bearing structure.
Figure 6:
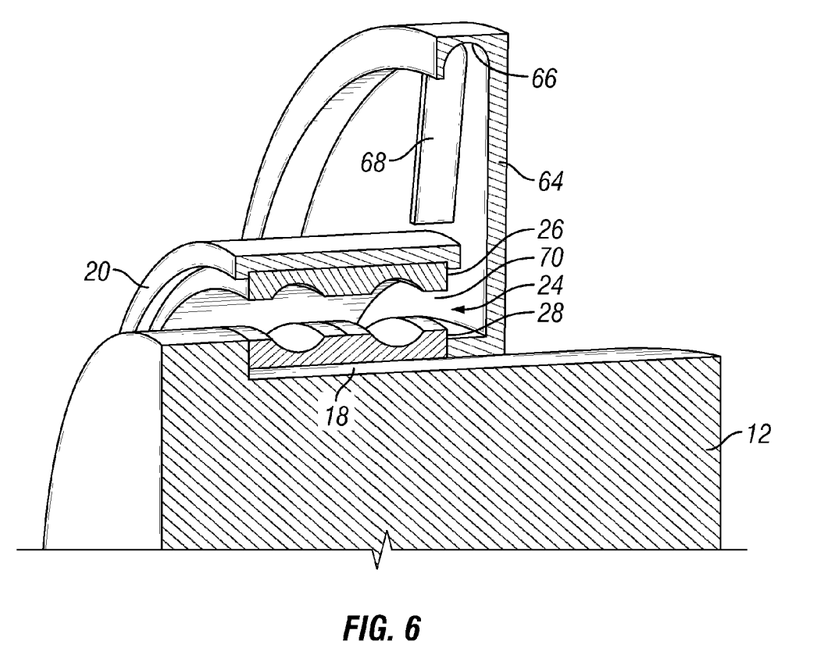
FIG. 6 is an enlarged scale detail view of an upper portion of the FIG. 4 auxiliary bearing structure.

FIGS. 4, 5, and 6 depict another illustrative auxiliary bearing system 60, according to one or more embodiments. The auxiliary bearing system 60 shown in FIGS. 4-6 is similar to the auxiliary bearing system 16 shown in FIGS. 1-3, and like reference numerals are used to indicate like parts. The auxiliary bearing system 60 includes a circular slinger 64 that is attached to and concentric with the inner race 28 and is adapted to rotate with the inner race 28. The slinger 64 may be positioned on one or both sides of the auxiliary bearing system 60. The slinger 64 is at least partially submerged in the lubricant L in the reservoir 40. The slinger 64 may have an annular groove or pocket 66 on the radially inner side of the slinger, distal the inner race 28. One or more scoop shaped fins 68 may be fixedly attached to the support wall 34 and disposed in the upper half of the auxiliary bearing system 16, opposite the reservoir 40 (see FIGS. 2 and 3). The remainder of the auxiliary bearing system 60 is substantially similar to the previously described auxiliary bearing system 16, and therefore the remainder of the auxiliary bearing system 16 will not be described in detail.

In an exemplary embodiment, during the operation of the rotor system 10 containing the auxiliary bearing system 60, when one or more of the magnetic bearing systems 14 fail, the shaft 12 drops onto the inner race 28 causing the inner race 28 to spin up or rotate. When the inner race 28 rotates, the slinger 64, which is fixedly attached to the inner race 28, rotates and collects lubricant L from the reservoir 40 within the slinger pocket 66. As the slinger 64 continues to rotate, a portion of the lubricant L trapped in the slinger pocket 66 is scooped away from the slinger pocket 66 by the stationary fin 68 and directed, both with its own inertia and with the aid of gravity, toward the roller element bearing 24. The lubricant L enters the roller element bearing 24 via the annular bearing space 70, lubricating the roller element bearing 24, and then drains back to the reservoir 40.

The length of the slinger 64 can be varied, allowing for variations in the lubricant L level in the reservoir 40 without compromising lubricating performance. The rate and location of flow of the lubricant L into the bearing 24 can be optimized with customization of the fins 68, including the geometry, number, and location of the fins 68. The amount of lubricant L flowing into the annular bearing space 70 can also be optimized by suitably designing the cross-sectional size of the pocket 66.

Figure 7:
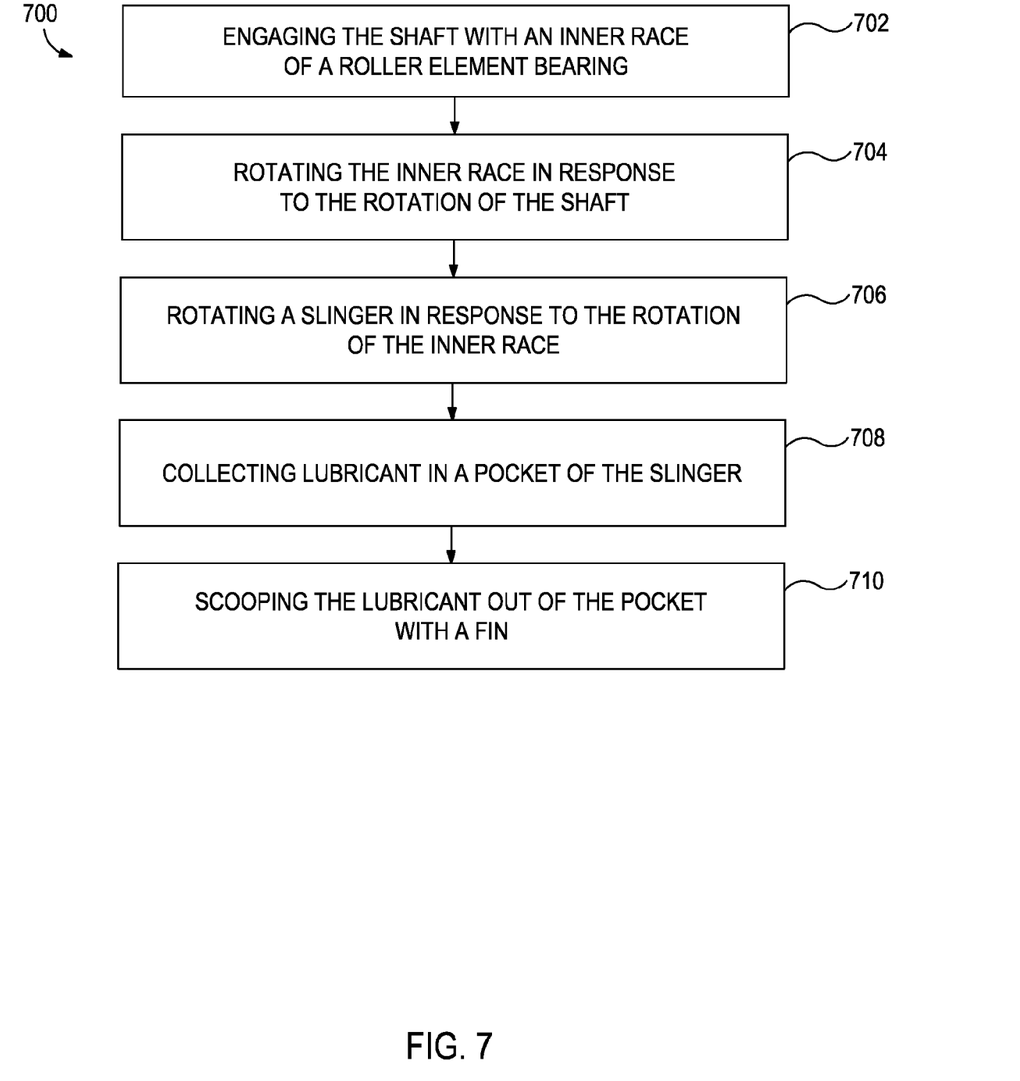
FIG. 7 is a flow chart illustration of a method of supporting a shaft with an auxiliary bearing, according to an exemplary embodiment.

FIG. 7 is a flow chart illustration of a method 700 of supporting a shaft with an auxiliary bearing, according to an exemplary embodiment. The method 700 includes engaging the shaft with an inner race of a roller element bearing, as shown at 702. The method 700 also includes rotating the inner race in response to the rotation of the shaft, as shown at 704. The method 700 further includes rotating a slinger in response to the rotation of the inner race, the slinger being coupled to or integrated with the inner race, as shown at 706. The method 700 further includes collecting lubricant in a pocket of the slinger, as shown at 708. The method 700 further includes scooping the lubricant out of the pocket with a fin, as shown at 710.

Although the present disclosure has described embodiments relating to specific turbomachinery, it is understood that the apparatus, systems and methods described herein could applied to other environments. For example, according to another exemplary embodiment, rotating machinery that is driven by a turbomachine may be configured to use embodiments of the auxiliary bearing systems described above.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An auxiliary bearing, comprising:
    a bearing mount disposed circumferentially about a shaft;
    a support wall extending radially inward from the bearing mount, the support wall defining a first annular cavity;
    an outer race coupled to a radially inner surface of the support wall;
    an inner race rotatably coupled to the outer race, wherein a radial clearance is defined between the shaft and the inner race when a primary bearing is supporting the shaft;
    a plurality of rolling elements disposed between the inner race and the outer race;
    a pool of lubricant disposed within the first annular cavity;
    a slinger coupled to or integral with the inner race, wherein an end of the slinger, distal the inner race, is adapted to collect lubricant from the pool;
    a pocket formed in the end of the slinger distal the inner race; and
    at least one fin disposed within the auxiliary bearing and extending into the pocket, the at least one fin configured to scoop the lubricant out of the pocket formed in the slinger, such that the collected lubricant scooped from the pocket is directed via gravity and the inertia of the collected lubricant to the plurality of roller elements.

2. The auxiliary bearing of claim 1, wherein the pocket is formed in a radially inner side of the slinger.

3. The auxiliary bearing of claim 1, wherein the at least one fin is disposed in an upper half of the auxiliary bearing, with respect to gravity.

4. The auxiliary bearing of claim 1, further comprising a second annular cavity axially offset from the first annular cavity.

5. The auxiliary bearing of claim 4, wherein a plurality of openings are defined in the support wall and allow fluid communication between the first annular cavity and the second annular cavity.

6. The auxiliary bearing of claim 1, wherein a level of the pool of lubricant is at about a center of the lowermost one of the plurality of rolling elements.

7. The auxiliary bearing of claim 1, wherein a level of the pool of lubricant is varied to adjust an amount of the lubricant distributed within the auxiliary bearing.

8. The auxiliary bearing of claim 1, wherein the lubricant is oil.

9. A method of supporting a rotating shaft with an auxiliary bearing, comprising:
   engaging the shaft with an inner race of a roller element bearing;
   rotating the inner race in response to the rotation of the shaft;
   rotating a slinger in response to the rotation of the inner race, the slinger being coupled to or integrated with the inner race;
   collecting lubricant in a pocket formed in the slinger; and
   scooping the lubricant out of the pocket with a fin extending into the pocket, such that the collected lubricant scooped from the pocket is directed via gravity and the inertia of the collected lubricant to the roller element bearing.

10. The method of claim 9, wherein the pocket is formed in an end of the slinger distal the inner race, and wherein the pocket is formed on a radially inner side of the slinger.

11. The method of claim 10, wherein collecting the lubricant in the pocket formed in the slinger further comprises:
   collecting the lubricant in the pocket of the slinger from a reservoir, wherein the reservoir is defined by a bearing mount disposed circumferentially about the shaft and a support wall extending radially inward from the bearing mount.

12. The method of claim 11, further comprising:
   lubricating the roller element bearing with the lubricant after the lubricant is scooped out of the pocket.

13. The method of claim 12, further comprising:
   draining the lubricant into the reservoir from the roller element bearing.

\* \* \* \* \*